(12) United States Patent
Rubinstein et al.

(10) Patent No.: US 6,594,707 B1
(45) Date of Patent: Jul. 15, 2003

(54) SMART COMMUNICATION AGENT (75) Inventors: Alan Rubinstein, Fremont, CA (US); Jason Fung, Milpitas, CA (US); Gary Wang, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/397,388

(22) Filed: Sep. 15, 1999

(51) Int. Cl.[7] .............................................. G06F 15/16
(52) U.S. Cl. ...................................... 709/250; 709/236
(58) Field of Search ........................ 379/93.07; 439/131, 439/218, 489; 709/227, 228, 250, 236

(56) References Cited

U.S. PATENT DOCUMENTS

| 5,501,608 A | * | 3/1996 | Scheer et al. | 439/218 |
| 5,649,001 A | * | 7/1997 | Thomas et al. | 379/93.07 |
| 5,671,355 A | * | 9/1997 | Collins | 709/250 |
| 5,719,942 A | * | 2/1998 | Aldred et al. | 709/228 |
| 5,772,466 A | * | 6/1998 | Morin et al. | 439/489 |
| 6,059,583 A | * | 5/2000 | Croft et al. | 439/131 |

* cited by examiner

*Primary Examiner*—Patrice Winder
(74) *Attorney, Agent, or Firm*—Wagner, Murabito & Hao LLP (57) ABSTRACT

A method for transmitting a data packet from a computer system to an external device, where the computer system and the external device communicatively coupled by an external connector. Various types of external connectors may be used depending, for example, on whether the connection is a remote connection to a network or a direct network connection. The type of external connector is recognized. An application being used by the computer system to generate the data packet is identified. The data packet is automatically configured depending on the type of external connector. The present invention thus reduces or eliminates the need for user intervention when different types of external connectors are used.

33 Claims, 5 Drawing Sheets

SMART COMMUNICATION AGENT

TECHNICAL FIELD

The present invention pertains to a software driver for an input/output device used by a computer system to transmit information over an external connection. In particular, the present invention pertains to a method for recognizing the characteristics and capabilities of the type of connection and for optimizing the transmission of information accordingly.

BACKGROUND ART

A stand-alone computer system's functionality is dramatically enhanced by coupling it with other computers to form a computer network. One popular type of computer network is known as a local area network (LAN). In a computer network, users may readily exchange files, share information stored on a common database, pool resources, communicate via e-mail, and perform other functions as well. Another advantage to computer networks is that they can be accessed from remote locations via a modem or various other types of communication equipment.

Typically, in order to be connected to a LAN, a general purpose computer system requires a peripheral input/output device such as a network adapter or network interface card (NIC). NICs may also be used to connect a computer to the Internet. For a LAN connection, an external connector cable such as an RJ45 connector is plugged into the NIC at one end, and at the other end into some sort of wall jack or similar receptacle that provides access to the network. The external connector cable provides one part of the physical link between the computer system and the LAN over which data, etc., can be transmitted and received.

From a remote location, using a modem or the like, access to the LAN is accomplished using a different external connector such as an RJ11 connector. One end of the external connector is plugged into a modem jack on the computer system, and the other end is plugged into a phone jack or similar receptacle. The physical link between the computer system and the LAN in this case is provided by a dial-up connection through the external connector and through phone lines to a receiver on the network.

The external connector for the direct LAN connection (e.g., the RJ45 connector) and the external connector for the modem connection (e.g., the RJ11 connector) require different software drivers. In order to provide the computer system with the capability for both direct LAN connection and remote access, the computer system (specifically, the communications applications) must be configured according to the appropriate software drivers and protocols. This task is complex and generally requires a level of expertise beyond that of the typical user. Consequently, this task has to be accomplished by trained personnel, usually at a cost, thereby incurring additional expenses over the cost of the connection hardware. Once the computer system is properly configured to provide both direct LAN connection and remote access, user intervention is still often required to connect to the network. For example, the user must still specify the type of connection to be made (direct or remote), and may need to input other information before the connection to the network can be made.

In addition, each of the various types of external connectors have different capabilities (e.g., different transmission rates and bandwidths). For example, the transmission rate over a modem connection is less than that over a digital subscriber line. As described above, user intervention is typically required to identify the type of external connector. Typically, default settings are used in an attempt to marry an application with the type of external connection; however, the default settings may be lacking for some unique applications, and in some cases the defaults do not work. User intervention to change default settings may result in an improvement but, as described above, this can be complex and generally requires a level of expertise beyond that of the typical user.

The problems with the prior art described above are exacerbated by the many other options that are or soon will be available for making remote or direct network connections, such as cable modems, digital subscriber lines, wireless connections, and the like.

Thus, a need exists for a method that considers the capabilities of the type of external connection relative to the various types of communications applications and to the type of information to be transmitted. A need further exists for a method that accomplishes the above and is easily put to use by a computer system user. The present invention provides a novel solution to these needs.

DISCLOSURE OF THE INVENTION

The present invention provides a method that considers the capabilities of the type of external connector relative to the various types of communications applications and to the type of information to be transmitted. The present invention also provides a method that is easily put to use by a computer system user.

The present invention pertains to a method for transmitting a data packet from a computer system to an external device, where the computer system and the external device communicatively coupled by an external connector. Various types of external connectors may be used depending, for example, on whether the connection is a remote connection to a network or a direct network connection (e.g., a local area network). The type of external connector is recognized. An application being used by the computer system to generate the data packet is identified. The data packet is automatically configured depending on the type of external connector. The present invention thus reduces or eliminates the need for user intervention when different types of external connectors are used.

In the present embodiment, the application is identified by monitoring the applications that are executed by the computer system and identifying the application currently being executed. In one embodiment, a memory register of the computer system that monitors the applications is read to identify the application currently being executed.

In one embodiment, depending on the type of external connector and also the application being executed, the data packet is encrypted. In another embodiment, the data packet is sized according to the type of external connector. In another embodiment, the refresh rate and frame size for a data packet containing video data are adjusted according to the type of external connector. In yet another embodiment, error detection and correction are disabled (for example, for a real time data stream). In one more embodiment, the data packet is automatically transmitted when a particular type of external connector is recognized.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "recognizing," "identifying," "configuring," "detecting," "monitoring," "reading" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

The present invention is described in the context of a physical connection between devices; however, it is appreciated that aspects of the present invention can be utilized in other types of connections such as wireless or infrared. The present invention is also described in the context of a connection between a computer system and a peripheral device or between a computer system and a network (e.g., a local area network). However, it is appreciated the present invention is not limited to these applications, and can be used to establish a connection between a variety of devices including intelligent consumer electronic devices (e.g., set-top boxes).

Figure 1:
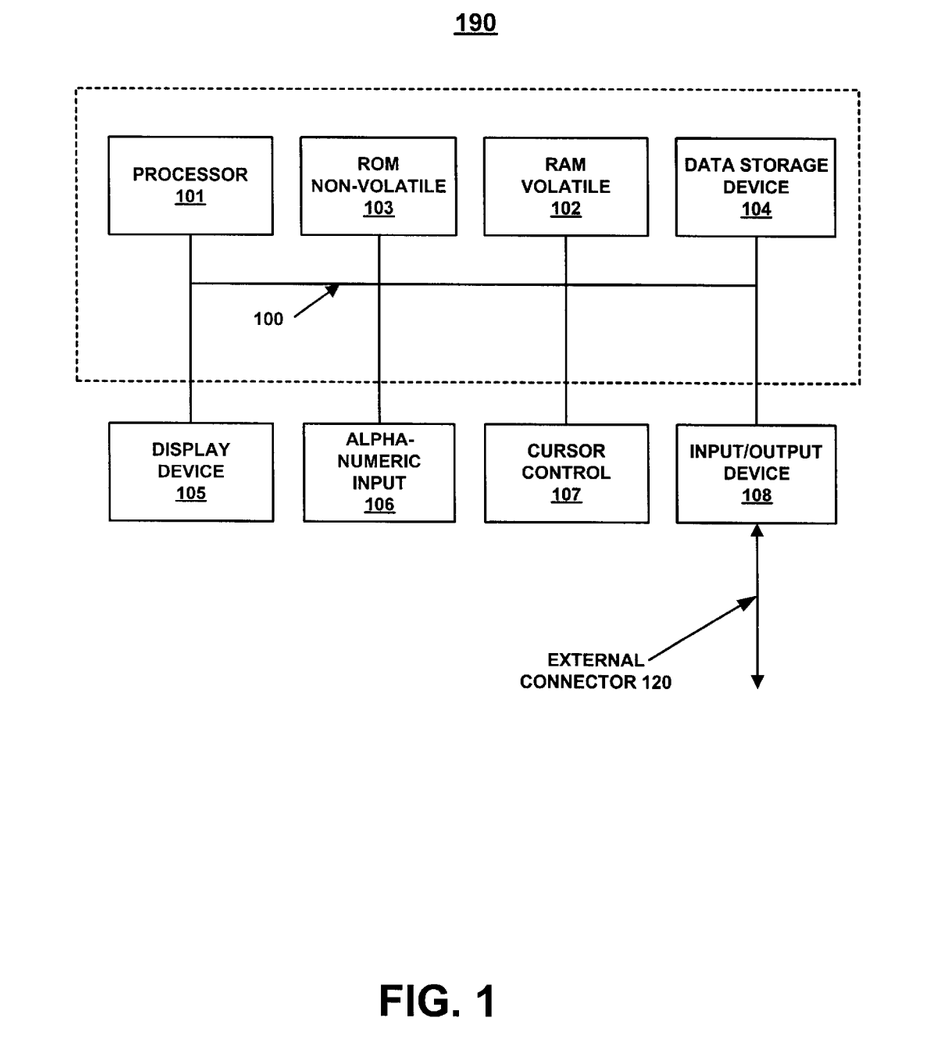
FIG. 1 is a block diagram of an exemplary computer system in accordance with one embodiment of the present invention.

Refer now to FIG. 1, which illustrates an exemplary computer system 190 with which embodiments of the present invention may be implemented. Computer system 190 can be one of the various types of computer systems in use as well as anticipated, including desktop computers, laptops, hand-held devices, and the like.

In general, computer system 190 comprises bus 100 for communicating information, processor 101 coupled with bus 100 for processing information and instructions, random access (volatile) memory 102 coupled with bus 100 for storing information and instructions for processor 101, read-only (non-volatile) memory 103 coupled with bus 100 for storing static information and instructions for processor 101, and data storage device 104 such as a magnetic or optical disk and disk drive coupled with bus 100 for storing information and instructions. Processor 101 of computer system 190 executes various routines and programs ("applications") that are stored as software and/or firmware in the computer-readable memory units listed above. In one embodiment, computer system 190 implements a known routine that monitors these applications, and maintains a directory of their status (e.g., whether they are currently in use and executing) in a memory register (e.g., read-only memory 103).

Computer system 190 further comprises an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the twodimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Furthermore, input/output (I/O) device 108 is coupled with bus 100 of computer system 190. In one embodiment, I/O device 108 is one of the various types of network interface cards or network adapters known in the art. In one embodiment, I/O device 108 is a universal communications adapter used for direct and/or remote network access via external connector 120; in this embodiment, I/O device 108 can mate with various sizes and shapes of external connectors. Additional information is provided below.

External connector 120 is one of the various types of connectors, in use as well as anticipated, such as RJ connectors (e.g., RJ11 and RJ45 connectors), modem connectors including cable modems, network connectors, ISDN (Integrated Services Digital Network) lines, and ADSL (Asymmetric Digital Subscriber Lines). External connector 120 communicatively couples (either directly or remotely) computer system 190 to an external device such as another computer system on a computer system network.

In accordance with one embodiment of the present invention, the characteristics and capabilities (e.g., available bandwidth) of each of the various types of external connectors are known and stored in a memory unit of computer system 190. Also known is the primary application for each of the various types of external connectors, and this information is also stored in computer system 190 (for example, it is known and stored in memory that an RJ11 connector is typically used for a remote modem connection). This and any other information regarding the characteristics and capabilities of the various types of external connectors is loaded into computer system memory as part of the driver software associated with I/O device 108, for example.

Figure 2A:
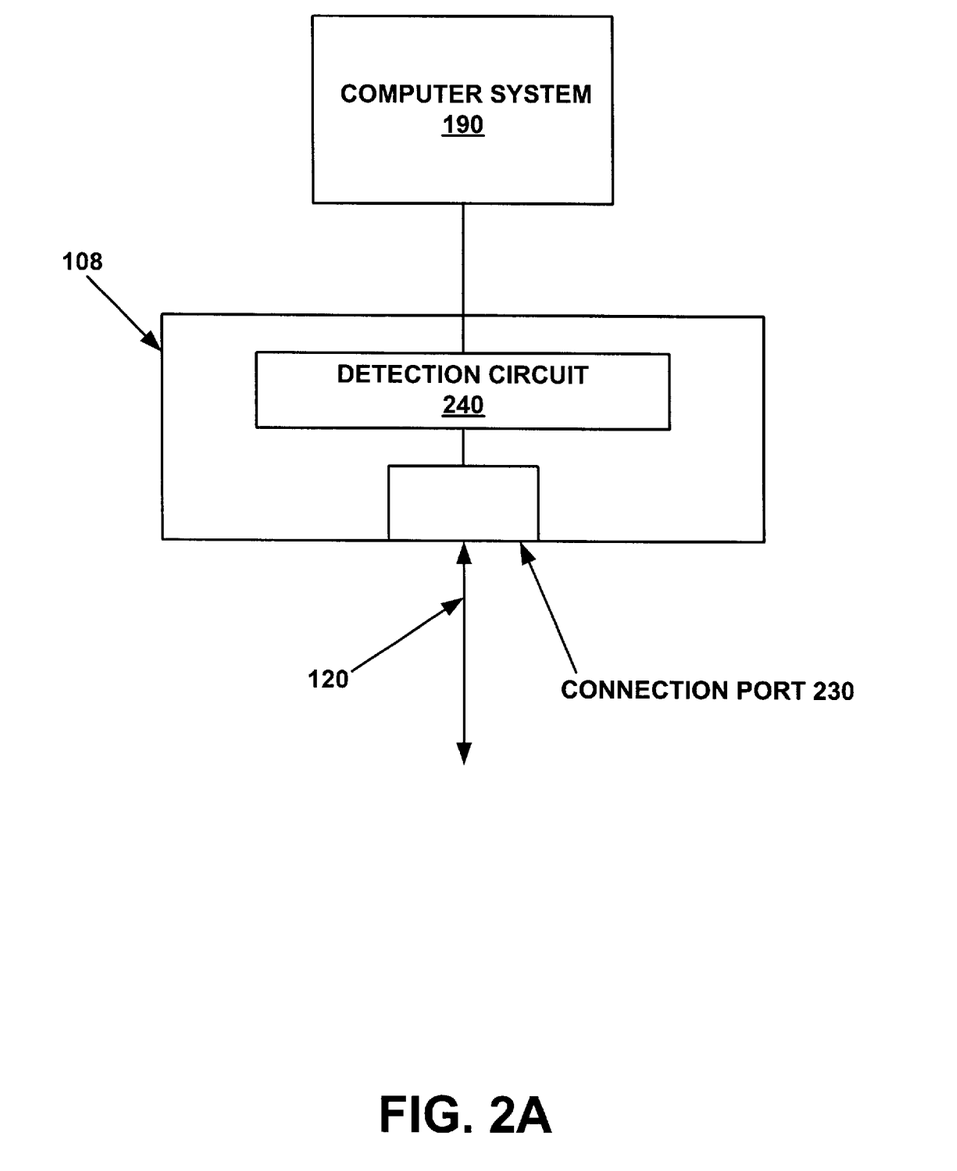
FIG. 2A is a block diagram of one embodiment of an input/output (I/O) device with which embodiments of the present invention may be practiced.

FIG. 2A is a block diagram of one embodiment of a universal, communications adapter (e.g., I/O device 108 of FIG. 1) with which embodiments of the present invention may be practiced. I/O device 108 includes connection port 230 that is used to connect with external connector 120. In the present embodiment, connection port 230 is designed as a single receptacle that can mate with various sizes and shapes of external connectors; that is, connection port 230 can accommodate the different sizes of plugs that can be present on different types of external connectors. For example, connection port 230 can mate with an RJ11 connector and with an RJ45 connector, even though these two connectors have different size plugs.

Detection circuit 240 functions to distinguish one type of external connector from another; that is, for example, detection circuit 240 detects an RJ11 connection when an RJ11 connector is used, and an RJ45 connection when an RJ45 connector is used. Additional information is provided in conjunction with FIG. 3. It is appreciated that means other than detection circuit 240 may be used to detect the type of external connector being used. It is also appreciated that a detection circuit or some other means is not needed in order to implement the present invention; for example, the type of external connector being used can be identified to computer system 190 as user input.

Figure 2B:
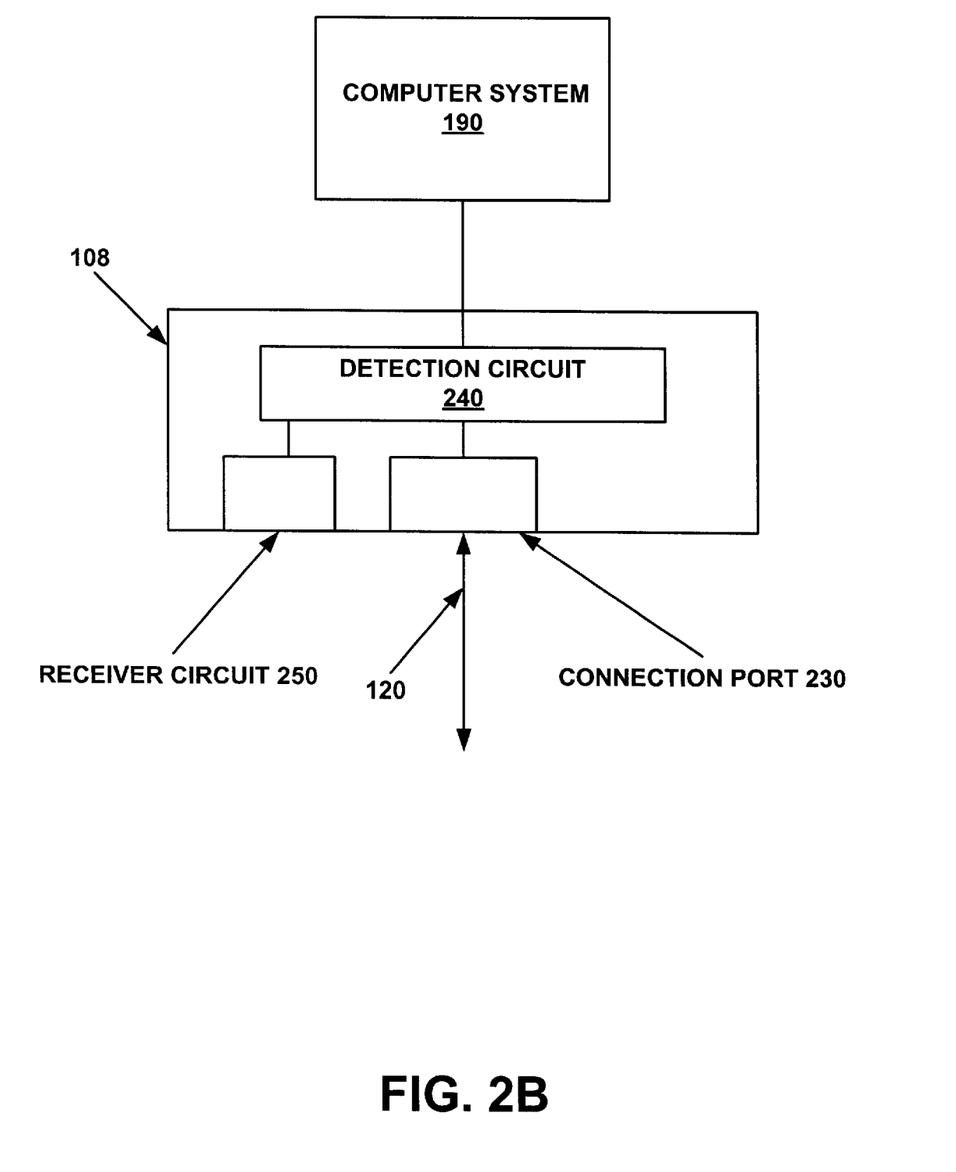
FIG. 2B is a block diagram of another embodiment of an I/O device with which embodiments of the present invention may be practiced.

FIG. 2B is a block diagram of another embodiment of a universal communications adapter (e.g., I/O device 108 of FIG. 1) with which embodiments of the present invention may be practiced. In this embodiment, in addition to connection port 230, I/O device 108 also includes receiver circuit 250 for wireless or infrared connections. Receiver circuit 250 includes a receiver unit (not shown) of a type known in the art which receives an infrared or other type of wireless signal from a remote device. Receiver unit 250 translates the transmitted signal into an analog or digital signal that is then forwarded to detection circuit 240. Receiver circuit 250 can be tuned to receive a signal of a particular frequency or wavelength. Receiver unit 250 can also be programmed to automatically establish a connection with a remote unit when computer system 190 (FIG. 1) is within range of the remote unit, and to release the connection when the computer system is no longer in range.

Figure 3:
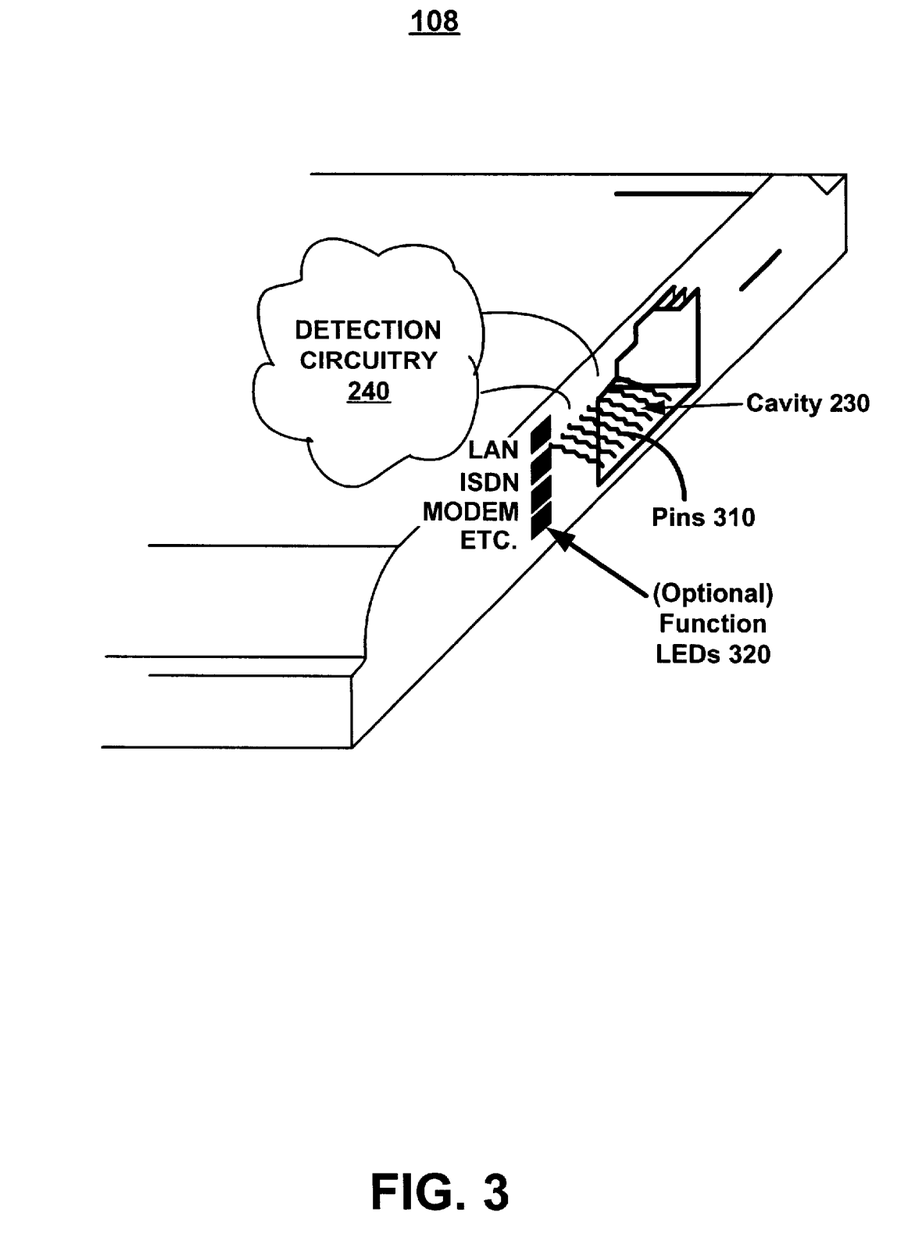
FIG. 3 is an illustration of one embodiment of an I/O device with which embodiments of the present invention may be practiced.

FIG. 3 is an illustration of one embodiment of the universal communications adapter of FIG. 2A with which embodiments of the present invention may be practiced. In this embodiment, connection port 230 (referred to in the figure as cavity 230) is sized and shaped to allow different sizes and shapes of plugs to be inserted. Cavity 230 contains pins 310 that make contact with corresponding pins on a plug when the plug is inserted. When a plug is inserted, some or all of the pins are used, depending on the type of plug that is inserted. The pins 310 are coupled to detection circuit 240.

There are different ways to detect the physical presence of a plug in connection port 230. For example, in one embodiment, pins 310 can be spring pins; when some number of the pins are depressed or picked up, that would mean that a plug is inserted. The number of pins that are depressed or picked up provides an indication of the type of external connector 120 being used, because a wider plug such as an RJ45 connector would depress more pins than a narrower plug such as an RJ11 connector. Other mechanical or optical means can be used in accordance with the present invention to detect the insertion of an external connector into connection port 230.

Continuing with reference to FIG. 3, in one embodiment, detection circuit 240 detects the presence of voltage in external connector 120 (FIG. 1) and connection port 230. The presence of the voltage indicates that a connection has been made. The level of voltage can be measured to determine whether the voltage is characteristic of a telephone line. If so, this would indicate that an RJ11 connector, for example, is in use, further indicating that a modem connection has been made. Detection circuit 240 can also be used to detect the number of pins (e.g., pins 310) that are receiving a signal, and this information can be used to determine the width of the plug as described above.

In one embodiment, detection circuit 240 detects a change in state in external connector 120, such as a periodic pulse. Detection circuit 240 detects the presence of a "heartbeat" data packet (that is, a data packet sent out periodically over a network from a server computer system to a client computer system on the network to determine, among other things, that the server and client computer systems, are still communicating). The presence of a heartbeat data packet would indicate that an RJ45 connector, for example, is in use, further indicating that a direct network connection has been made.

In one embodiment, detection circuit 240 detects the presence of, for example, a dial tone on external connector 120, and thus provides a means of detecting whether a modem connection can be made. For example, whereas the presence of a voltage on external connector 120 would indicate a connection is present as explained above, in the case where a connection has not yet been made, the presence of a dial tone would indicate that a modem connection is possible.

In one embodiment, detection circuit 240 detects that external connector 120 is properly configured and attached correctly by checking that the heartbeat data packet is properly received. This provides another means of detecting whether a direct network connection has been made.

It is appreciated that, in other embodiments, detection circuit 240 can detect other characteristics of a signal received from external connector 120 in order to detect other types of connections. That is, the unique characteristics of other types of connections (e.g., ISDN, ADSL, etc.) can be used by detection logic 240 to detect those connections.

Based on the information received, detection circuit 240 determines whether the connection is a direct connection (e.g., LAN) or a remote connection. In one embodiment, detection circuit 240 sets a bit or bits to a particular value in a status register (not shown) to indicate the type of connection. For example, a binary value of zero could be used to indicate a direct network connection, and a binary value of one would then indicate a remote connection.

Figure 4:
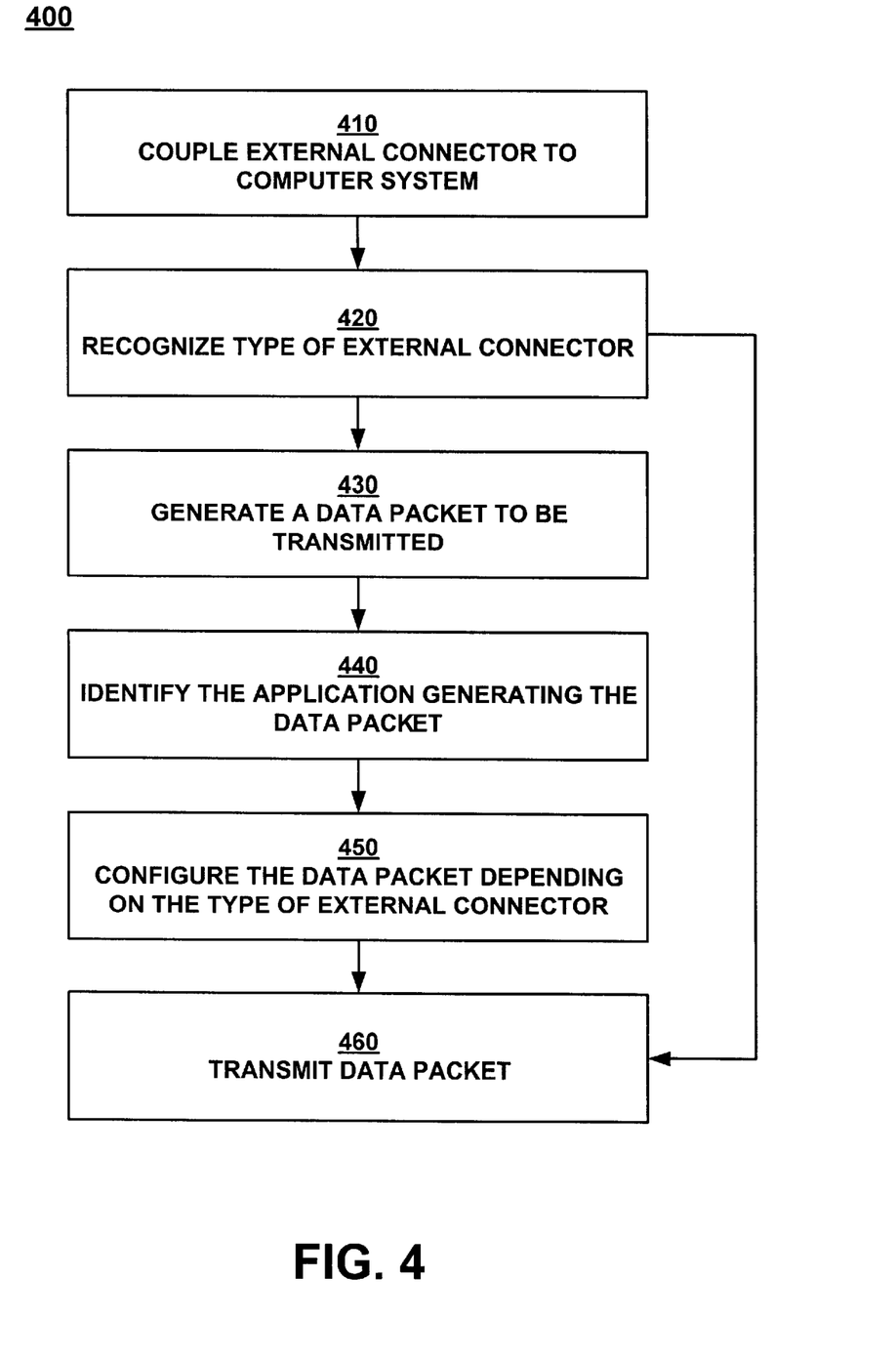
FIG. 4 is a flowchart of steps in a process implemented in accordance with one embodiment of the present invention.

FIG. 4 is a flowchart of the steps of a process 400 implemented in accordance with one embodiment of the present invention. With reference also to FIG. 1, process 400 is implemented as computer-readable instructions stored in memory (e.g., random access memory 102 or read only memory 103) executed by processor 101 of computer system 190. Process 400 can also be implemented via a computer-usable medium (such as a compact disk) and data storage device 104.

In step 410 of FIG. 4, a user couples external connector 120 to I/O device 108 of computer system 190. In accordance with the present invention, external connector 120 can be one of the various types of connectors, in use as well as anticipated, such as RJ connectors (e.g., RJ11 and RJ45 connectors), modem connectors including cable modems, network connectors, ISDN (Integrated Services Digital Network) lines, and ADSL (Asymmetric Digital Subscriber Lines). Accordingly, in the present embodiment, I/O device 108 is a universal communications adapter that is designed to couple with various sizes and shapes of external connectors. The other end of external connector 120 is typically plugged into some type of receptacle (e.g., a wall jack) depending on the type of connection (remote or direct) being made and the type of external connector being used.

In step 420, in the present embodiment, the present invention identifies the type of external connector 120 using detection circuit 240 (FIG. 3) or some other means, as described above. In accordance with the present invention, the capabilities and applications of each of the various types of external connectors are known and stored in a memory unit of computer system 190. Therefore, once the type of external connector 120 is identified, its capabilities (e.g., bandwidth) can be retrieved from memory. Also, the type of connection can also be identified (for example, direct network access or remote access via modem) based on the type of external connector 120 (e.g., an RJ45 connector would suggest a direct network connection) and/or characteristics of the connection (e.g., a heartbeat data packet would also suggest a direct network connection). In the present embodiment, the identification of the type of external connector 120, its capabilities and characteristics, and the type of connection made are done automatically in accordance with the present invention, and so user intervention is minimized. In another embodiment, the type of external connector 120 is identified by user input, and the present invention identifies its characteristics from computer system memory. Thus, embodiments of the present invention may be practiced with different types of I/O devices including those that do not have the capability to identify the type of external connector.

In one embodiment, based on the type of connection, the present invention can choose to initiate a function that was deferred. The type of connection would indicate whether connection to a network has been made, for example, so that queued e-mail can be sent and received. In one embodiment, the present invention can also further refine its decision based on the characteristics of the connection; for example, if a low data transmission rate is available, the transmission of data can be limited based on priority or on file size, with full data transmission coming when bandwidth becomes available.

In step 430, computer system 190 executes an application that generates one or more data packets that are intended to be transmitted over external connector 120 via I/O device 108 from computer system 190 to, for example, another computer system on the network.

In step 440, the application used to generate the data packet is identified using one of the various software routines that monitor applications. In one embodiment, the present invention accesses the monitoring software and identifies the application that is presently being executed. In another embodiment, a registry that maintains a directory of each application and its current status is accessed by the present invention in order to identify the application presently being executed.

In step 450, based on the characteristics of the type of external connector 120 and hence the characteristics of the type of connection, the present invention configures the data packet(s) (from step 430) in order to optimize the transfer of information. In one embodiment, the present invention examines the application used to generate the data packet(s) to determine if the data packet(s) contain proprietary information or the like; for example, some applications permit the user to indicate whether information is proprietary. Alternatively, the present invention can be associated with the communications driver that prepared the data packet(s) for transmission and supports I/O device 108. The present invention examines the type of connection and determines whether the data packet will be transmitted over an unsecured or external network. If the information is proprietary, the present invention automatically enables data encryption. Furthermore, the present invention could select the encryption method employed (hardware versus software). If software encryption is specified in the application, the present invention can choose to disable the software encryption and use hardware encryption if that capability is provided by I/O device 108. If hardware encryption is not available, then the present invention can choose to enable software encryption.

In one embodiment, when a voice application is set to use the connection, the present invention detects the nature of this application and disables error detection and correction, since voice traffic is real time in nature and should not incur the delays associated with error detection and correction.

In one embodiment, the present invention sizes the data packet to match the characteristics of the connection. For example, Internet Protocol (IP) networks could have the data packet generated by an application sized to match network packet sizes.

In another embodiment, the present invention gracefully degrades the level of service based on the type of connection. For example, if video data are being sent over a modem connection, the frame size and refresh rate could be reduced. For a high speed connection, full motion could be supported. Furthermore, if the bandwidth is too low to support video transmission, then a connection for this purpose could be denied.

The present invention is not limited to the embodiments described above, and can be implemented over DSL, cable modems, ISDN, serial communications channels, wireless connections, and other means.

In step 460, the data packet(s) are transmitted after they are configured as described above. The present invention thus provides an automatic process for recognizing the characteristics and capabilities of the type of connection that has been made, and for optimizing the transmission of information accordingly. In accordance with the present invention, the user plugs an external connector 120 into I/O device 108. The present invention recognizes the type of external connector and hence the type of connection, identifies an application being used to generate a data packet, and automatically undertakes the steps needed to transmit data over the connection. Little or no intervention is required on the part of the user after plugging in the external connector.

Thus, the present invention provides a method that considers the capabilities of the type of external connector relative to the various types of communications applications and to the type of information to be transmitted. The present invention also provides a method that is easily put to use by a computer system user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A method for transmitting a data packet from a computer system to an external device, said computer system and said external device communicatively coupled by an external connector, said method comprising the computer-implemented steps of:
    a) recognizing a type of external connector that is coupled to a connection port of said computer system, said external connector having a plug that is inserted into said connection port, said connection port sized to receive plugs of different sizes, said connection port comprising pins that make contact with pins on said plug, wherein said recognizing comprises detecting the size of said plug according to the number of pins of said connection port that make contact with pins on said plug;
    b) identifying an application being used by said computer system to generate said data packet; and
    c) automatically configuring said data packet depending on said type of external connector.

2. The method, for transmitting a data packet as recited in claim 1 wherein said type of external connector is for a remote connection between said computer system and said external device and wherein said step a) comprises:
    detecting voltage from said external connector.

3. The method for transmitting a data packet as recited in claim 2 wherein said type of external connector is an RJ11 connector.

4. The method for transmitting a data packet as recited in claim 1 wherein said type of external connector is for a direct connection between said computer system and said external device and wherein said step a) comprises:
    detecting a data packet from said external device, wherein said data packet from said external device is characteristic of a computer system network.

5. The method for transmitting a data packet as recited in claim 4 wherein said type of external connector is an RJ45 connector.

6. The method for transmitting a data packet as recited in claim 1 wherein said step b) comprises:
    monitoring applications executed by said computer system; and
    identifying an application being executed.

7. The method for transmitting a data packet as recited in claim 6 further comprising:
    reading a memory register of said computer system, wherein said memory register monitors said applications.

8. The method for transmitting a data packet as recited in claim 1 wherein said step c) comprises:
    encrypting said data packet.

9. The method for transmitting a data packet as recited in claim 1 wherein said step c) comprises:
    sizing said data packet according to said type of external connector.

10. The method for transmitting a data packet as recited in claim 1 wherein said step c) comprises:
    adjusting refresh rate and frame size for said data packet, wherein said data packet contains video data.

11. The method for transmitting a data packet as recited in claim 1 wherein said step c) further comprises:
    disabling error detection and correction.

12. The method for transmitting a data packet as recited in claim 1 further comprising:
    automatically transmitting said data packet when a particular type of external connector is recognized.

13. A computer system comprising:
    a bus;
    a processor coupled to said bus;
    a computer-readable memory register coupled to said bus;
    an input/output (I/O) device coupled to said bus, said I/O device comprising a connection port that is sized to receive plugs of different sizes; and
    an external connector comprising a plug that is inserted into said connection port, said external connector for communicatively coupling said computer system to an external device, said connection port comprising pins that make contact with pins on said plug;
    said processor for performing a method for transmitting a data packet from said computer system to said external device, said method comprising the steps of:
    a) recognizing a type of said external connector according to the size of said plug by detecting the number of pins of said connection port that make contact with pins on said plug;
    b) identifying an application being used by said computer system to generate said data packet; and c) automatically configuring said data packet depending on said type of external connector.

14. The computer system of claim 13 wherein said processor performs said method for transmitting a data packet wherein said step b) comprises:

monitoring applications executed by said computer system; and identifying an application being executed.

15. The computer system of claim 14 wherein said processor performs said method for transmitting a data packet wherein said step b) further comprises:

reading said memory register, wherein said memory register monitors said applications.

16. The computer system of claim 13 wherein said processor performs said method for transmitting a data packet wherein said step c) comprises:

encrypting said data packet.

17. The computer system of claim 13 wherein said processor performs said method for transmitting a data packet wherein said step c) comprises:

sizing said data packet according to said type of external connector.

18. The computer system of claim 13 wherein said processor performs said method for transmitting a data packet wherein said step c) comprises:

adjusting refresh rate and frame size for said data packet, wherein said data packet contains video data.

19. The computer system of claim 13 wherein said processor performs said method for transmitting a data packet wherein said step c) further comprises:

disabling error detection and correction.

20. The computer system of claim 13 wherein said processor performs said method for transmitting a data packet further comprising:

automatically transmitting said data packet when a particular type of external connector is recognized.

21. A computer-usable medium having computer-readable program code embodied therein for causing a computer system coupled to an external device by an external connector to perform the steps of:

a) recognizing a type of external connector that is coupled to a connection port of said computer system, said external connector having a plug that is inserted into said connection port, said connection port sized to receive plugs of different sizes, said connection port comprising pins that make contact with pins on said plug, wherein said recognizing comprises detecting the size of said plug according to the number of pins of said connection port that make contact with pins on said plug;

b) identifying an application being used by said computer system to generate said data packet; and c) automatically configuring said data packet depending on said type of external connector.

22. The computer-usable medium of claim 21 wherein said computer-readable program code embodied therein causes a computer system to perform the steps of:

monitoring applications executed by said computer system; and identifying an application being executed.

23. The computer-usable medium of claim 22 wherein said computer-readable program code embodied therein causes a computer system to perform the step of:

reading said memory register, wherein said memory register monitors said applications.

24. The computer-usable medium of claim 21 wherein said computer-readable program code embodied therein causes a computer system to perform the step of:

encrypting said data packet.

25. The computer-usable medium of claim 21 wherein said computer-readable program code embodied therein causes a computer system to perform the step of:

sizing said data packet according to said type of external connector.

26. The computer-usable medium of claim 21 wherein said computer-readable program code embodied therein causes a computer system to perform the step of:

adjusting refresh rate and frame size for said data packet, wherein said data packet contains video data.

27. The computer-usable medium of claim 21 wherein said computer-readable program code embodied therein causes a computer system to perform the step of:

disabling error detection and correction.

28. The computer-usable medium of claim 21 wherein said computer-readable program code embodied therein causes a computer system to perform the step of:

automatically transmitting said data packet when a particular type of external connector is recognized.

29. A method for transmitting a data packet from a computer system to an external device, said computer system and said external device communicatively coupled by an external connector, said method comprising the computer-implemented steps of:

a) recognizing a type of external connector that is coupled to a connection port of said computer system, said external connector having a plug that is inserted into said connection port, said connection port sized to receive plugs of different sizes, said connection port comprising pins that make contact with pins on said plug, wherein said recognizing comprises detecting the size of said plug according to the number of pins of said connection port that make contact with pins on said plug;

b) identifying an application being used by said computer system to generate said data packet; and c) encrypting said data.

30. A method for transmitting a data packet from a computer system to an external device, said computer system and said external device communicatively coupled by an external connector, said method comprising the computer-implemented steps of:

a) recognizing a type of external connector that is coupled to a connection port of said computer system, said external connector having a plug that is inserted into said connection port, said connection port sized to receive plugs of different sizes, said connection port comprising pins that make contact with pins on said plug, wherein said recognizing comprises detecting the size of said plug according to the number of pins of said connection port that make contact with pins on said plug;

b) identifying an application being used by said computer system to generate said data packet; and c) sizing said data packet according to said type of external connector.

31. A method for transmitting a data packet from a computer system to an external device, said computer system and said external device communicatively coupled by an external connector, said method comprising the computer-implemented steps of:

a) recognizing a type of external connector that is coupled to a connection port of said computer system, said external connector having a plug that is inserted into said connection port, said connection port sized to receive plugs of different sizes, said connection port comprising pins that make contact with pins on said plug, wherein said recognizing comprises detecting the size of said plug according to the number of pins of said connection port that make contact with pins on said plug b) identifying an application being used by said computer system to generate said data packet, wherein said data packet contains video data; and c) adjusting refresh rate and frame size for said data packet.

32. A method for transmitting a data packet from a computer system to an external device, said computer system and said external device communicatively coupled by an external connector, said method comprising the computer-implemented steps of:

a) recognizing a type of external connector that is coupled to a connection port of said computer system, said external connector having a plug that is inserted into said connection port, said connection port sized to receive plugs of different sizes, said connection port comprising pins that make contact with pins on said plug, wherein said recognizing comprises detecting the size of said plug according to the number of pins of said connection port that make contact with pins on said plug;

b) identifying an application being used by said computer system to generate said data packet; and c) disabling error detection and correction.

33. A method for transmitting a data packet from a computer system to an external device, said computer system and said external device communicatively coupled by an external connector, said method comprising the computer-implemented steps of:

a) recognizing a type of external connector that is coupled to a connection port of said computer system, said external connector having a plug that is inserted into said connection port, said connection port sized to receive plugs of different sizes, said connection port comprising pins that make contact with pins on said plug, wherein said recognizing comprises detecting the size of said plug according to the number of pins of said connection port that make contact with pins on said plug; and b) automatically transmitting said data packet when a particular type of external connector is recognized.

\* \* \* \* \*